March 25, 1958     O. BERTOYA     2,827,948
SLIDING SEATS

Filed April 25, 1955     4 Sheets-Sheet 2

United States Patent Office 2,827,948
Patented Mar. 25, 1958

2,827,948

SLIDING SEATS

Oscar Bertoya, Manchester, England, assignor to Renold Chains Limited, Manchester, England, a British company Application April 25, 1955, Serial No. 503,744

Claims priority, application Great Britain April 27, 1954

7 Claims. (Cl. 155—14)

This invention relates to sliding seats and is more particuarly concerned with sliding seats of the kind (hereinafter referred to as the kind described) comprising a movable part, which is sat upon when the seat is in use, and stationary support means therefor, the movable part being slidable over the support means. Seats of the kind described commonly include releasable locking means for securing the movable part when it has been adjusted to a desired position and are commonly employed in motor vehicles e. g. as the driver's seat to allow the movable part to be positioned in relation to the driving controls, to suit drivers of various sizes.

It is an object of the invention to provide an improved sliding seat.

The invention provides a sliding seat of the kind described in which there are interposed between the movable part and the support means, bearings comprising tracks extending in the direction of movement of the movable part and spaced apart perpendicularly to that direction and roller chains extending lengthwise along the tracks with their rollers in contact therewith.

In a preferred construction the roller chains are secured to the movable part, and are maintained in tension. The releasable locking means preferably comprise detents engageable with links of the chains, e. g. between rollers thereof.

One construction of a sliding seat embodying the invention will now be described by way of example with reference to the accompanying drawings in which.

Figure 1:
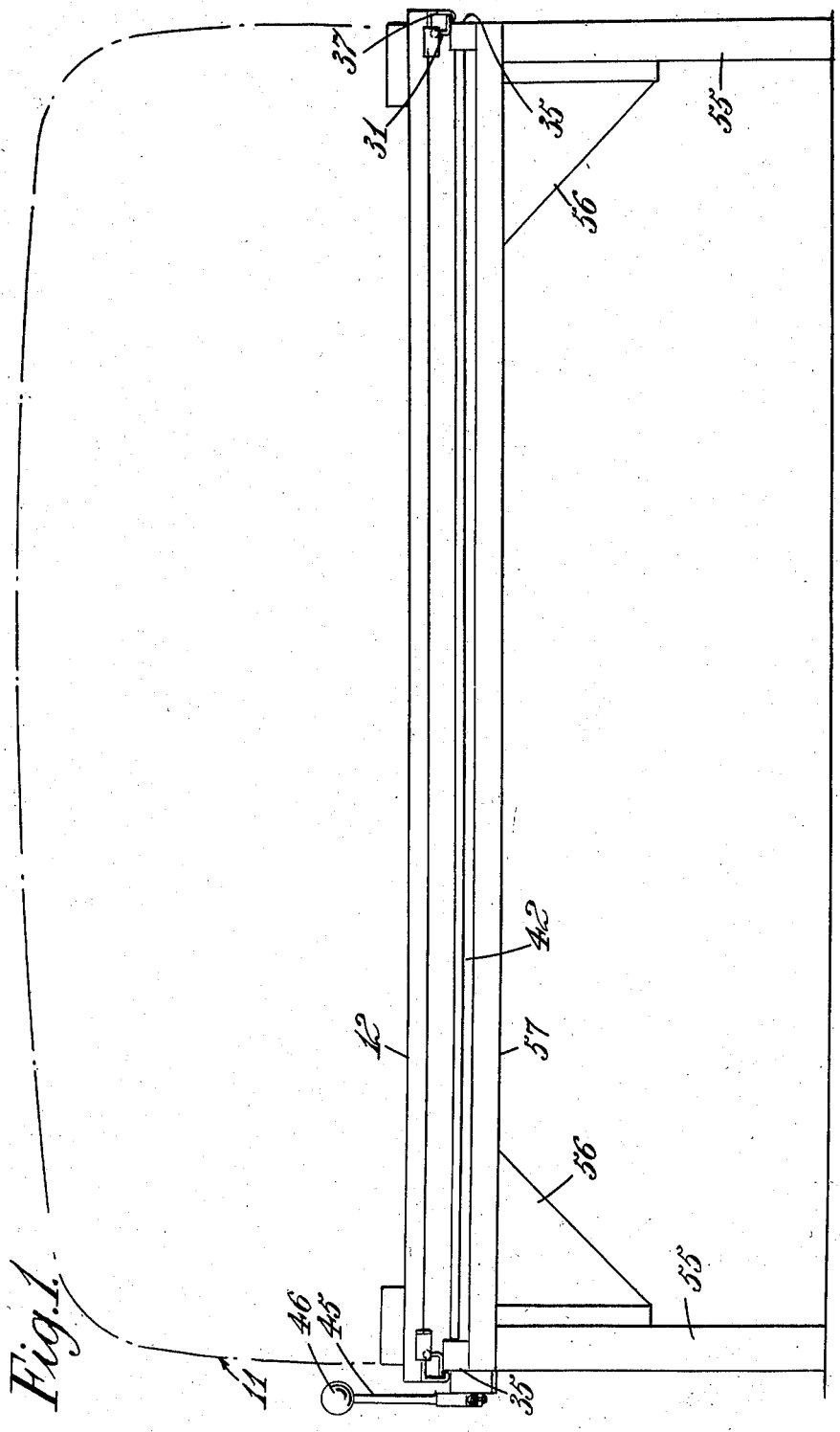
Figure 1 is a front elevation of the seat.
Figure 2:
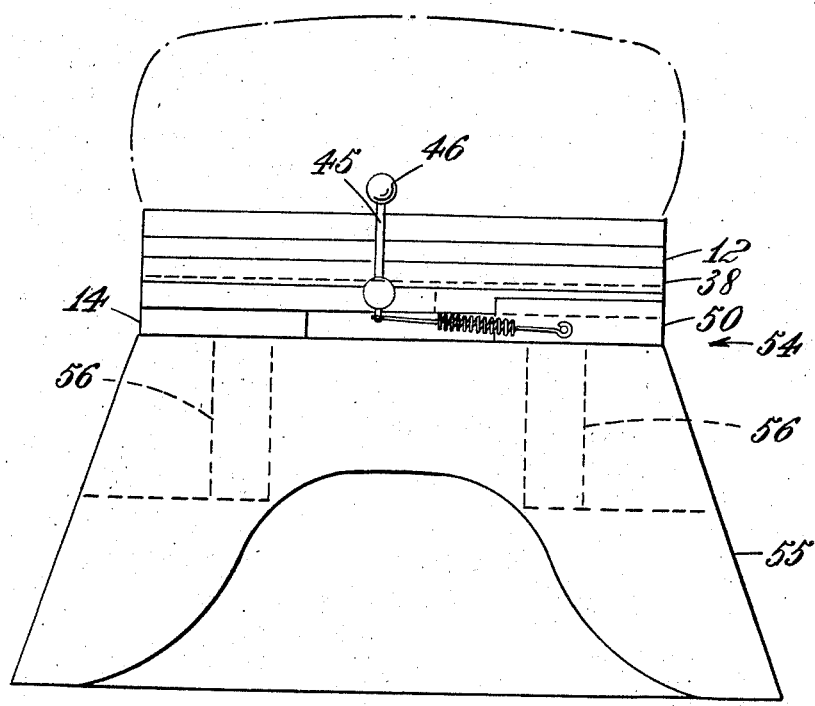
Figure 2 is a side elevation of the seat.
Figure 3:
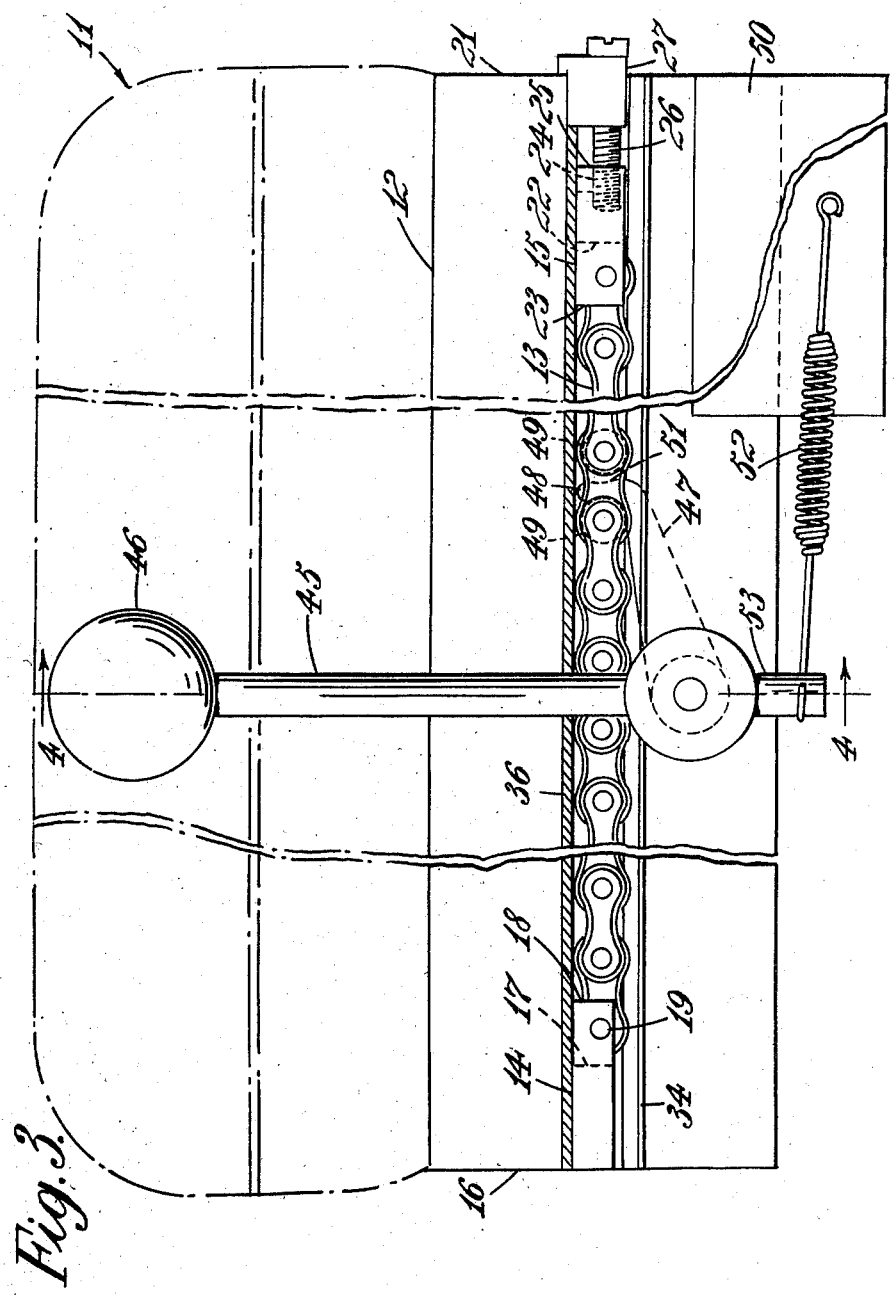
Figure 3 is a part sectional elevation of the seat bearings.
Figure 4:
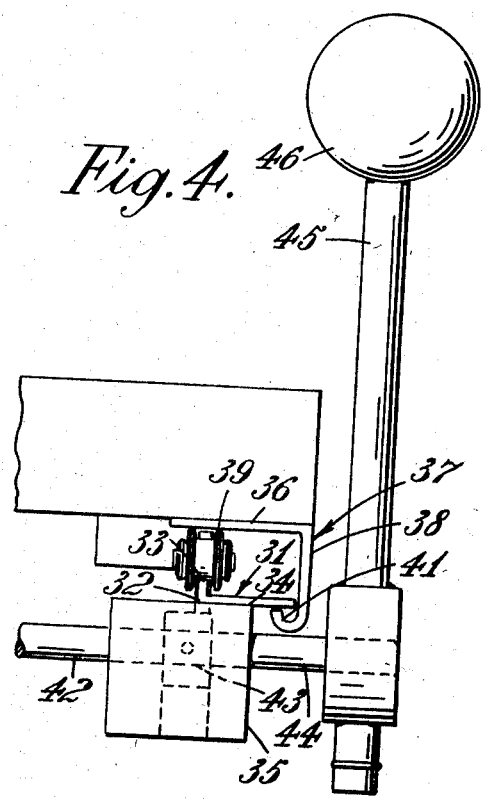
Figure 4 is a sectional elevation on the line 4—4 of Figure 3.

In this example the sliding seat is in a motor vehicle. The movable part 11 of the seat comprises a flat, rectangular, base plate 12 along the underside of which two lengths of conventional roller chain 13 are secured and an upholstered part (shown in chain lines in Figures 1 and 2). Each length of chain 13 extends adjacent to, and parallel to one side of the base plate 12 and is secured to the underside of the base plate by two anchoring blocks 14, 15. Each of the two anchoring blocks 14 located at the forward edge 16 of the seat, is fixedly secured to the seat and is provided with a rectangular, cut-out recess 17 in the rearward face 18 to receive one end of the associated roller chain 13, the chain 13 being retained within the recess by a retaining pin 19 extending through the end bush and roller of the chain 13. Each of the two anchoring blocks 15 located at the rearward edge 21 of the seat is similarly provided with a recess 22 in its forward face 23 to receive the other end of the associated roller chain 13. A tapped, blind bore 24 extends forwardly into each of the two rear anchoring blocks 15, from the rear face thereof 25, to receive a tensioning screw 26. Each tensioning screw 26 extends through a guide block 27 secured to the base plate 12, so that by rotating the tensioning screws 26 in the appropriate direction, the rear anchoring blocks 15 may be moved away from the front anchoring blocks 14 thereby to tension the chains 13.

Beneath the chains extend respectively two horizontal metal strips 31, each having one longitudinal margin 32 vertically upturned so that the upper edge 33 of the upturned margin 32 provides a track on which the rollers of the associated chain 13 run. Each strip 31 has its horizontal part 34 secured to the top surface of an approximately square-sectioned metal bar 35 extending parallel to the sides of the base plate 12, so that the upturned margin 32 lies approximately centrally along the bar 35. The horizontal part 34 of the strip 31 projects outwardly beyond the outwardly directed face of the bar 35.

Along each side margin of the lower face of the base plate 12 extends the horizontal limb 36 of an elongated member 37 of L-section, the vertical limbs 38 of the two L-sectioned members 37 projecting downwardly flush with the edges of the base plate 12. The horizontal limbs 36 of these members 37 are secured to the base plate 12 and lie in contact with the upper edges of the side plates 39 of the respective chains 13. The free edge of the dependent vertical limb 38 of each L-sectioned member 37 is doubled back internally over itself near to that end to provide an inwardly directed channel 41 of U-shaped section, to hook under the projecting portion of the horizontal limb 34 of each L-strip 31 on which the tracks 33 are provided, thereby serving to retain the movable part of the seat on its support and shielding the chain 13 from dust, dirt and the like.

A rotatable, cylindrical rod 42 extends across the underside of the base plate 12. The rod 42 is journalled into one of the aforesaid metal bars 35 to which an L-strip 31 is secured, and extends through a bore 43 in the other bar 35 to provide a projecting portion 44. Rigidly mounted on the projecting portion 44 is an upwardly extending radial arm 45 having a knob 46 on its free end and providing an operating lever situated at a position accessible to the driver.

Two shorter radial arms 47 are secured to the rod 42 at positions respectively beneath the two chains 13 and they each carry at their free ends integral upturned detents 48 for engagement in the space between a pair of adjacent rollers 49 of the associated chain 13. Each detent 48 has a neck 51 shaped on both sides to mate with the shape of the parts of the rollers 49 with which it may contact. The free end of the detent 48 is rounded and of such size that it can pass the rollers 49 as the rod 42 is rotated to bring the detents 48 into and out of engagement with the chains 13. The detents 48 can be engaged with the chains 13, to prevent movement of the movable part of the seat, when the movable part of the seat is at any one of a succession of positions in its range of movement, determined by the chain pitch.

The handle 45, 46 is spring biased, by a helical tension spring 52 connected between a forward extension 53 of the operating arm 45 below the pivot, and a part 50 of the seat support, into the position it occupies when the detent 48 engages the chains 13 and movement of the seat is prevented.

A notch is cut in each of the two track L-strips, and the bars on which those strips are mounted are suitably apertured, to permit the aforesaid movement of the detents and the arms on which they are carried.

The two aforesaid square-sectioned bars 35 are supported on a framework 54 comprising two vertical side plates 55 extending fore and aft along the floor of the vehicle and joined at their upper edges, which are horizontal, by a horizontal plate 57 braced at each side by two triangular brace-struts 56 secured adjacent the front and rear edges of the side plates 55 respectively. The two bars 35 are secured to the ends of the horizontal plate 57 so that the strips 31 extend horizontally and parallel to the side plates 55, the outwardly directed surface of each strip 31 lying vertically above the outwardly directed surface of each side plate 55.

The rollers of the lengths of roller chain resting on their appropriate tracks enable the seat to be moved readily in the direction of the tracks, when the detents are disengaged.

In this example the chains are conventional bicycle chains of 0.50 inch pitch.

The invention is not restricted to the details of the foregoing example. For instance two operating handles may be provided, one at each side of the seat. The invention is not restricted to sliding seats for use in motor cars. For instance a seat in accordance with the invention may be used for sliding seats in boats and the like.

I claim:

1. A sliding seat, comprising in combination, a movable part, which is sat upon in use, stationary support means therefor, the movable part being slidable over the support means, bearings interposed between said movable part and said stationary support means, and releasable locking means for securing the movable part when it has been adjusted to a desired position, said bearings comprising tracks extending in the direction of movement of said movable part and spaced apart perpendicularly to that direction and roller chains extending lengthwise along the tracks with their rollers in contact therewith, said releasable locking means comprising detents engageable with links of the chains.

2. A sliding seat as claimed in claim 1, wherein spring means are provided for urging said detents into positions in which they engage with the links of the chains and wherein means are provided for moving said detents against said spring means into positions in which they are disengaged from the links of the chains thereby permitting said movable part of the seat to be moved relative to said support means.

3. A sliding seat as claimed in claim 2, wherein means are provided for preventing said movable part from being lifted away from said support means.

4. A sliding seat as claimed in claim 3, wherein shielding means are provided for shielding said roller chains and said tracks from dust, grit and the like.

5. A sliding seat, comprising in combination, a movable part, which is sat upon in use, stationary support means therefor, bearings interposed between said movable part and said support means, said bearings comprising tracks extending in the direction of movement of said movable part and spaced apart perpendicularly to that direction and roller chains extending lengthwise along the tracks with their rollers in contact therewith, and releasable locking means for securing the movable part when it has been adjusted to a desired position, said releasable locking means comprising detents engageable with links of the chains, spring means for urging said detents into positions in which they engage with the links of the chains, and means for moving said detents against said spring means into positions in which they are disengaged from the links of the chains thereby permitting said movable part of the seat to be moved relatively to said support means.

6. A sliding seat, comprising in combination, a movable part, which is sat upon in use, stationary support means therefor, the movable part being slidable over the support means, bearings interposed between said movable part and said stationary support means, and releasable locking means securing the movable part when it has been adjusted to a desired position, said bearings comprising tracks extending in the direction of movement of said movable part and spaced apart perpendicular to that direction and roller chains extending lengthwise along the tracks with their rollers in contact therewith, said releasable locking means comprising at least one detent engaged with the bearings between two rollers thereof, spring means retaining said detent so engaged, and means for disengaging said detent from between said rollers.

7. A sliding seat, comprising in combination, a movable part which is sat upon in use, stationary support means therefor, two spaced parallel tracks supported by said support means and extending in the direction of movement of said movable part, two roller chains secured in spaced, parallel relationship to the underside of the movable part of the seat so that the side plates thereof abut against the underside of the movable part and so that the rollers thereof engage with the said tracks, a pintle journalled to said stationary support means, two detent arms secured to said pintle and engageable respectively with said roller chains, spring means for urging said detents into positions in which they engage with said roller chains, and a lever secured to said pintle and operable to rotate said pintle to disengage said detents from said roller chains thereby permitting said movable part of the seat to be moved relative to said support member.

References Cited in the file of this patent

UNITED STATES PATENTS

| 859,425 | Batts | July 9, 1907 |
| 2,171,854 | Lee | Sept. 5, 1939 |

FOREIGN PATENTS

| 400,486 | Great Britain | Oct. 26, 1933 |
| 624,730 | Germany | Jan. 27, 1936 |